May 30, 1950 — W. L. CRAWFORD — 2,509,628
COASTER BRAKE AND FREEWHEELING DEVICE
Filed Nov. 13, 1945
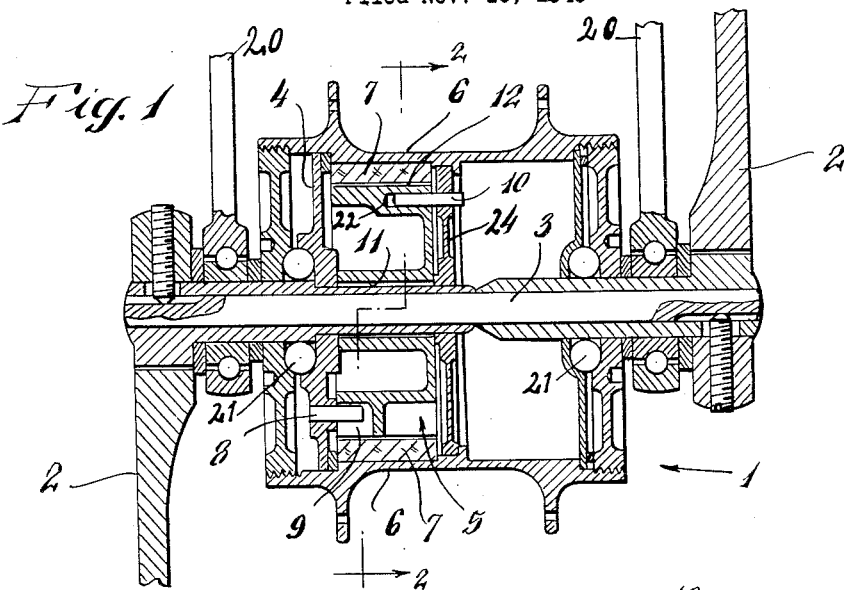
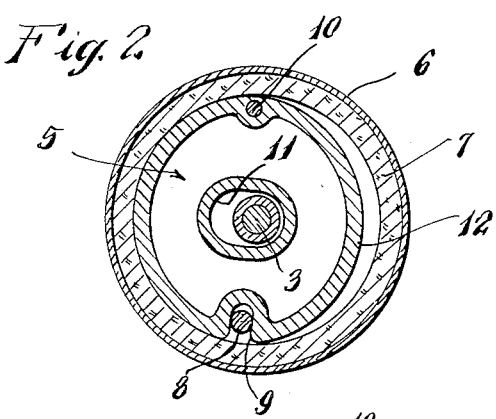
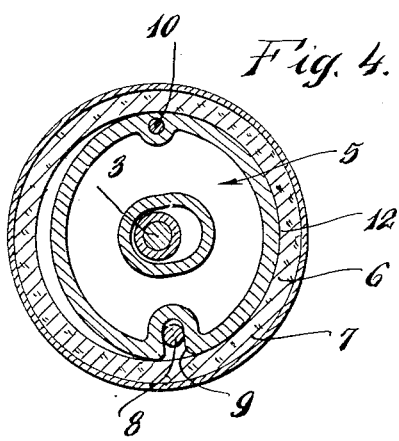
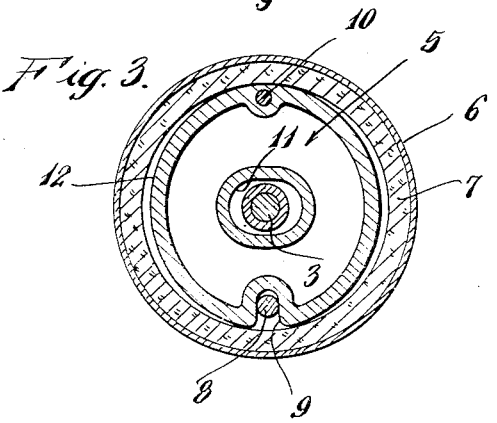
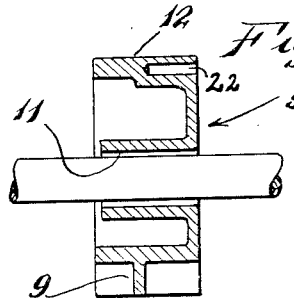
INVENTOR
William L. Crawford
BY Henry J. E. Metzler
Agt.

Patented May 30, 1950

2,509,628

UNITED STATES PATENT OFFICE 2,509,628

COASTER BRAKE AND FREEWHEELING DEVICE

William L. Crawford, Plainfield, N. J.

Application November 13, 1945, Serial No. 628,313

2 Claims. (Cl. 192—6)

This invention relates to improvements in coaster brakes and free wheeling devices.

An object of this invention is to provide an improved free wheeling and coaster brake mechanism of simplified construction and especially applicable to the wheel hub or to the crank hanger of a velocipede, tricycle or the like. Another object of this invention is to provide a driving, coasting and braking unit that embodies improved features, and which is so constructed that it may be easily and removably mounted in unit-handling relation in a velocipede crank hanger or in the hub of the driving wheel of a tricycle or the like.

Free wheeling devices of various sorts have long been employed in bicycles, notwithstanding the fact that they are a frequent source of trouble. Metal balls of the ball bearing type have generally been employed, often being mounted in such manner that when the sprocket is in driving engagement with the hub such balls are forced outwardly within the shell of the hub. After a relatively short period of use distortion of the surfaces engaged frequently results and the device becomes noisy and unreliable in operation. Furthermore, the metal balls tend to wear rapidly and the whole assembly becomes loose. Such difficulties are especially apparent when the free wheeling device is employed in conjunction with a coaster braking mechanism and it is therefore a primary object of this invention to provide a free wheeling device for bicycles and the like which will be of simple, rugged construction and able to support the stresses which are encountered in use.

Still another object of this invention is to provide such a device which will produce less distortion of the surfaces engaged and be substantially noiseless in operation.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Figure 1 is a longitudinal sectional view of a preferred embodiment of my invention;

Figure 2 is a cross-sectional view on the line 2—2 of Figure 1 showing the device in driving position;

Figure 3 is a cross-section similar to Figure 2, but showing the device in free wheeling position;

Figure 4 is a cross-section similar to Figure 2, but showing the device in braking position; and Figure 5 is a longitudinal sectional view of a detail which will be more fully explained hereinafter.

Similar numerals refer to similar parts throughout the several views.

In the drawing the numeral 1 denotes a driving wheel hub of a child's tricycle adapted to be actuated by means of pedals 2 which are secured to the extremities of an axle 3 in a well known manner and whose hubs have sleeve extensions which enclose the entire axle 3. This pedal arrangement forms no part of my present invention, and I shall call in this specification the axle and pedal sleeve arrangement simply "the axle 3," which turns in the frame portion 20 of the tricycle.

The wheel hub 6 is rotatably mounted on the axle 3 by means of bearings 21 in a well known manner. A disk 4 is secured to the axle 3 by means of a key connection or in any other suitable manner and its periphery is in rotary engagement with the inner side of the hub 6; while a plate 24 is in rotary engagement with the axle 3, which is extended through the center of plate 24, and the periphery of plate 24 is in rotary, slightly frictional engagement with the inner side of the hub 6. A circular brake lining 7, which may consist of any suitable cork-rubber composition or the like, is secured to that portion of the inner side of hub 6 which is located between the disk 4 and the plate 24.

In the space surrounded by the inner side of the circular lining 7 and by the parts 4 and 24 there is located a drum 5 whose periphery 12 is slightly elliptic and which has in its center portion a curved longitudinal collar 11, through which the axle 3 is loosely extended. The rim of the drum 5 is provided at one side with a bore 22 and at the opposite side with a recess 9. A cross pin 8, which extends laterally from the disk 4, engages the recess 9, while a pivot pin 10, which is secured to the plate 24, extends into the bore 22 and constitutes an eccentric pivot connection between the parts 24 and 5.

If the axle 3 is turned in a clockwise direction, the pin 8 presses the drum 5 against the lining 7 in the manner shown in Figure 2, so that the hub 6 is taken along and is also rotated in a clockwise direction. If the axle 3 is not rotating but the hub 6 rotates (Fig. 3), the periphery 12 of the drum 5 is not pressed against the lining 7, so that the hub 6 can rotate freely. If hub 6 rotates in a clockwise direction and the axle 3 is turned in an anti-clockwise direction, the periphery of the drum 5 is in frictional engagement with the lining 6 (Figure 4) so that a coaster braking action is attained.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as directed by the scope of the following claims.

Having thus described my invention, what I claim and desire to secure by Letters Patent in the United States is:

1. A coaster brake and free wheeling device for bicycles and the like comprising an axle, a wheel hub mounted on said axle, bearings supporting said hub on said axle, a circular brake shoe mounted within said hub, a disk through whose center said axle is keyed, a plate through whose center said axle is extended and whose periphery is in rotary engagement with said hub, an elliptic drum having in its center portion a curved longitudinal collar and being eccentrically pivoted to said plate, and a cross pin eccentrically secured to said disk and engaging a recess in the periphery of said drum opposite the pivot connection between said plate and the drum, said axle being extended through and fitting loosely into said collar, and the inner side of said brake shoe being adjacent the periphery of said drum, all substantially as set forth.

2. A device of the character described comprising an axle, a hollow wheel hub mounted on said axle and supported thereon by bearings, a brake lining secured to a portion of the inner side of said hub, an elliptic drum within that portion of said hub which is provided with said brake lining having in its center portion a curved longitudinal collar section through which said axle is loosely extended and having in its rim portion a recess and opposite to the recess a bore which is parallel to said axle, said drum being located between two disks the first of which has said axle keyed through its center and has its peripheral portion in rotary engagement with said hub, while the second disk has said axle extended through its center and is with its periphery in rotary engagement with said hub, a pin being secured to said second disk and extended into the bore in the rim portion of said drum, and a cross pin eccentrically secured to said first disk engaging the recess in the rim portion of said drum.

WILLIAM L. CRAWFORD.

REFERENCES CITED

The following references are of record in the file of this patent:

UNITED STATES PATENTS

| Number | Name | Date |
| --- | --- | --- |
| 710,844 | Copeland | Oct. 7, 1902 |
| 923,254 | Ellet and Forsyth | June 1, 1909 |
| 1,398,883 | Mottlau | Nov. 29, 1921 |
| 1,454,707 | Davis | May 8, 1923 |
| 2,224,907 | Gee | Dec. 17, 1940 |